United States Patent
Chen et al.

(10) Patent No.: US 9,707,720 B2
(45) Date of Patent: Jul. 18, 2017

(54) METHOD FOR CONTROLLING THREE-DIMENSIONAL PRINTING APPARATUS AND THREE-DIMENSIONAL PRINTING SYSTEM

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Peng-Yang Chen, New Taipei (TW); Wen-Ten Lin, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 481 days.

(21) Appl. No.: 14/474,193

(22) Filed: Sep. 1, 2014

(65) Prior Publication Data
US 2015/0352791 A1 Dec. 10, 2015

(30) Foreign Application Priority Data
Jun. 9, 2014 (TW) .............................. 103119909 A

(51) Int. Cl.
B29C 67/00 (2017.01)
B33Y 50/02 (2015.01)
G06F 19/00 (2011.01)

(52) U.S. Cl.
CPC .......... B29C 67/0088 (2013.01); B33Y 50/02 (2014.12)

(58) Field of Classification Search
CPC ........................... B29C 67/0088; B33Y 50/02
(Continued)

(56) References Cited

U.S. PATENT DOCUMENTS 3,081,496 A * 3/1963 Moore ................. B29C 44/583
264/216
5,089,184 A 2/1992 Hirano et al.
(Continued)

FOREIGN PATENT DOCUMENTS

JP 8156109 6/1996
JP 2003039564 2/2003

OTHER PUBLICATIONS

"Office Action of China Counterpart Application," issued on Mar. 20, 2017, p. 1-p. 9.

*Primary Examiner* — Ryan Coyer
(74) *Attorney, Agent, or Firm* — Jianq Chyun IP Office

(57) ABSTRACT

A method for controlling a three-dimensional printing apparatus and a three-dimensional printing system are provided. The method is applicable to controlling a tank of the three-dimensional printing apparatus and includes the following steps. A plurality of layer objects of a three-dimensional object are obtained according to a three-dimensional model, and the layer objects include a first layer object. A structural friability level of the first layer object is obtained according to cross-section information and a printing sequence of the first layer object. A swing velocity of the tank is determined according to the structural friability level. The tank is controlled to swing according to the swing velocity corresponding to the first layer object, such that the cured first layer object is separated from a bottom of the tank.

16 Claims, 7 Drawing Sheets

(58) Field of Classification Search
USPC .......................................................... 700/98
See application file for complete search history.

(56) References Cited

U.S. PATENT DOCUMENTS

| | | | |
|---|---|---|---|
| 6,405,095 B1 * | 6/2002 | Jang ................... | B29C 67/0081 |
| | | | 264/308 |
| 2003/0207959 A1 * | 11/2003 | Napadensky ....... | B29C 67/0059 |
| | | | 522/183 |
| 2010/0140850 A1 * | 6/2010 | Napadensky ....... | B29C 67/0059 |
| | | | 264/401 |
| 2011/0058010 A1 | 3/2011 | Aviel et al. | |
| 2012/0201960 A1 * | 8/2012 | Hartmann ........... | B29C 67/0062 |
| | | | 427/256 |
| 2012/0231232 A1 * | 9/2012 | Xu ...................... | B29C 67/0092 |
| | | | 428/195.1 |
| 2014/0085620 A1 | 3/2014 | Lobovsky et al. | |
| 2014/0306380 A1 * | 10/2014 | El-Siblani ........... | B29C 67/0088 |
| | | | 264/401 |

* cited by examiner

METHOD FOR CONTROLLING THREE-DIMENSIONAL PRINTING APPARATUS AND THREE-DIMENSIONAL PRINTING SYSTEM

CROSS-REFERENCE TO RELATED APPLICATION

This application claims the priority benefit of Taiwan application serial no. 103119909, filed on Jun. 9, 2014. The entirety of the above-mentioned patent application is hereby incorporated by reference herein and made a part of this specification.

BACKGROUND

Technical Field

The technical field relates to a method for controlling a printing apparatus, and more particularly to a method for controlling a three-dimensional printing apparatus and a three-dimensional printing system.

Description of Related Art

In recent years, with the development of technology, various methods for building three-dimensional (3D) models using additive manufacturing technology such as a layer-by-layer structural model are provided one after another. In general, the additive manufacturing technology transforms design information of a 3D model structured by a software like computer-aided design (CAD) into a plurality of thin (quasi-two-dimensional) cross-section layers that are stacked continuously. Meanwhile, many technical means that are able to form thin cross-section layers are gradually provided. For instance, a printing module of a printing apparatus usually moves along an XY plane above a base according to space coordinates XYZ structured by the design information of the 3D model, so that a structuring material is formed into correct shapes of the cross-section layers. Therefore, by means of the movement of the printing module along an axis toward Z layer by layer, the plurality of cross-section layers are gradually stacked along a Z-axis, so that the structuring material forms a 3D object in a status of layer-by-layer solidification.

Take the technology of forming the 3D object by solidifying the structuring material via a light source, the printing module is adapted for immersion in a liquid curing material contained in a tank, and the light source radiates the liquid curing material serving as the structuring material on the XY plane, so that the liquid curing material is solidified and stacked on a movable platform. Thereby, by means of the layer-by-layer movement of the movable platform of the printing module along the axis toward Z layer by layer, the liquid curing material is solidified and stacked into the 3D object. It is worth noting that when the light source is disposed below the tank, the object under printing that has just been solidified and cured by the light source adheres to a bottom of the tank. In order to let the liquid curing material keep to be solidified and stacked layer by layer on the movable platform, the 3D printing apparatus needs to separate the 3D object under printing from the bottom of the tank via a special separating mechanism. Therein, swinging the tank is a common separating mechanism. However, when the structure of the 3D object is too fragile, the 3D object may be ruptured during separation from the bottom of the tank if the swing velocity of the tank is too fast. On the other hand, if the swing velocity of the tank is too low, the 3D printing speed becomes slow. Therefore, it is still a main issue for developers in the art to enhance the speed and quality of 3D printing.

SUMMARY

In view of the above, a method for controlling a 3D printing apparatus and a 3D printing system are provided, which adaptively adjust a swing velocity of a tank according to a structure of an object for printing, so as to reduce a failure rate in printing and to save printing time.

A method for controlling a 3D printing apparatus, applicable for controlling the tank of the 3D printing apparatus, wherein the 3D printing apparatus is adapted for printing a 3D object relating to a 3D model, and the method includes the following steps. First, a plurality of layer objects of the 3D object are obtained according to the 3D model, and the layer objects include a first layer object. A structural friability level of the first layer object is obtained according to cross-section information and a printing sequence of the first layer object. Next, a swing velocity of the tank is determined according to the structural friability level. Further, the tank is controlled to swing according to the swing velocity corresponding to the first layer object, such that the cured first layer object is separated from a bottom of the tank.

From another perspective, a 3D printing system is provided, adapted for printing a 3D object relating to a 3D model, and the 3D printing system includes a 3D printing apparatus and a host apparatus. The 3D printing apparatus includes a tank for containing a liquid curing material, and the host apparatus is coupled to the 3D printing apparatus and includes a processor. The processor obtains a plurality of layer objects of the 3D object according to the 3D model, and the layer objects include a first layer object. The processor calculates a structural friability level of the first layer object according to cross-section information and a printing sequence of the first layer object. In addition, the processor determines a swing velocity of the tank according to the structural friability level.

Based on the above, the structural friability level is analyzed by means of the cross-section information and the printing sequences of the layer objects, and a force for swinging the tank and the swing velocity is determined according to the structural friability levels of the layer objects. Thereby, when the 3D printing apparatus intends to control the swing of the tank so that the layer object adhering to the bottom of the tank is separated from the bottom of the tank, the 3D printing apparatus adjusts the swing velocity of the tank according to structural characteristics and firmness level of the 3D object. Thus, the 3D printing apparatus avoids the condition that a solidified liquid curing material adheres to the bottom of the tank and is ruptured when the movable platform moves upwards. It is also avoided that the solidified liquid curing material sticks on the bottom of the tank and affects subsequent printing quality. Therefore, one of the embodiments indeed enhances the printing quality of the 3D printing apparatus.

To make the above features and advantages of the disclosure more comprehensible, several embodiments accompanied with drawings are described in detail as follows.

BRIEF DESCRIPTION OF THE DRAWINGS

The accompanying drawings are included to provide further understanding of the disclosure, and are incorporated in and constitute a part of this specification. The drawings

DESCRIPTION OF EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Furthermore, in the following embodiments, the same or similar components adopt the same or similar numerals.

Figure 1:
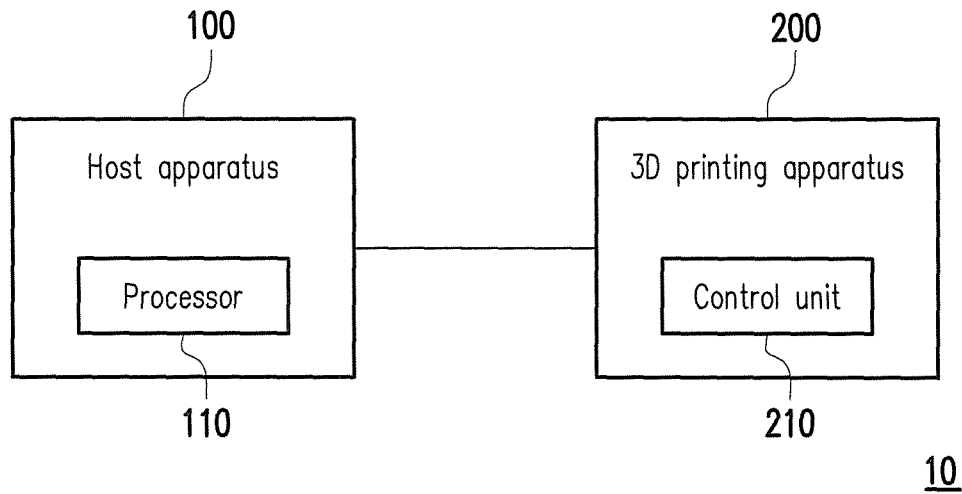
FIG. 1 illustrates a block diagram of a 3D printing system according to one of the exemplary embodiments.

FIG. 1 illustrates a block diagram of a 3D printing system according to one of the exemplary embodiments. Referring to FIG. 1, a 3D printing system 10 includes a host apparatus 100 and a 3D printing apparatus 200. The host apparatus 100 is coupled to the 3D printing apparatus 200 and includes a processor 110 having ability of operating and processing. The 3D printing apparatus 200 includes a control unit 210, and the control unit 210 controls a plurality of elements of the 3D printing apparatus 200 to achieve the function of 3D printing.

More specifically, the host apparatus 100 is an apparatus having operation functions, such as a computer like a notebook computer, a tablet computer or a desktop computer. The disclosure does not limit on the kind of the host apparatus 100. In the embodiment, the processor 110 of the host apparatus 100 is able to edit and process a 3D model of a 3D object and transmit relevant 3D printing information to the 3D printing apparatus 200, so that the 3D printing apparatus 200 prints the corresponding 3D object according to the 3D printing information. More particularly, the 3D model may be a digital 3D image file which is structured by the host apparatus 100 via CAD or an animation modeling software.

The 3D printing apparatus 200 is adapted for printing the 3D object according to the 3D printing information transmitted by the host apparatus 100. More specifically, the control unit 210 controls operation of each member in the 3D printing apparatus 200 according to the 3D printing information so as to print a curing material repeatedly on a platform until the whole 3D object is formed.

The processor 110 and the control unit 210 are, for example, a Central Processing Unit (CPU) or other programmable general-purpose or specific-purpose Microprocessor, a Digital Signal Processor (DSP), a programmable controller, Application Specific Integrated Circuits (ASIC), a Programmable Logic Device (PLD), or other similar apparatus or combinations of these apparatus. The disclosure is not limited thereto.

It should be noted that the 3D printing information that the 3D printing apparatus 200 is able to read and perform printing functions accordingly is generated via performing compilation and calculation on the 3D model. More specifically, the processor 110 of the host apparatus 100 first performs a slicing process to obtain a plurality of layer objects that compose the 3D object. In other words, the processor 110 slices the 3D model into a plurality of cross-section information, so that the 3D printing apparatus 200 obtains the plurality of layer objects in sequence according to the cross-section information of the 3D model, and the layer objects are stacked to form the 3D object.

Furthermore, the processor 110 generates a corresponding control code file according to the cross-section information of each layer object, so that the control unit 210 of the 3D printing apparatus 200 controls the members in the 3D printing apparatus 200 according to the control code file, thereby forming each layer object on the platform layer by layer. Herein, the control code file is the 3D printing information that the control unit 210 is able to read and perform printing functions accordingly. In an embodiment, the control code file is, for example, a G code file.

Figure 2:
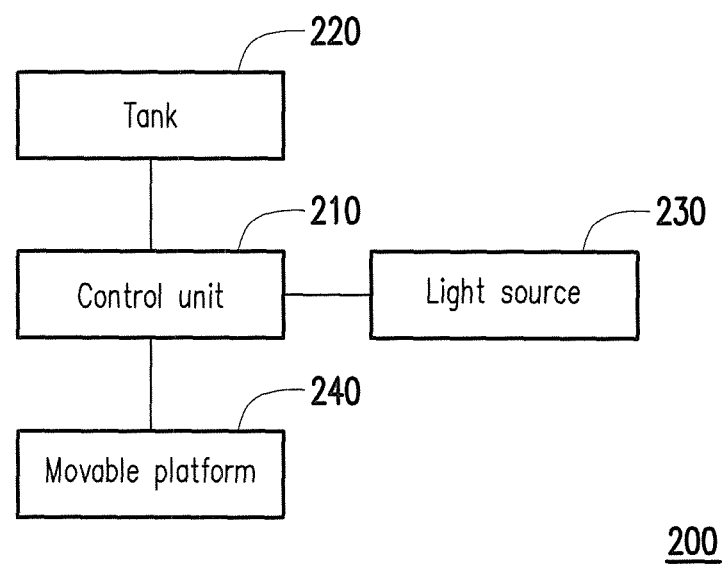
FIG. 2 illustrates a schematic block diagram of a 3D printing system according to one of the exemplary embodiments.
Figure 3:
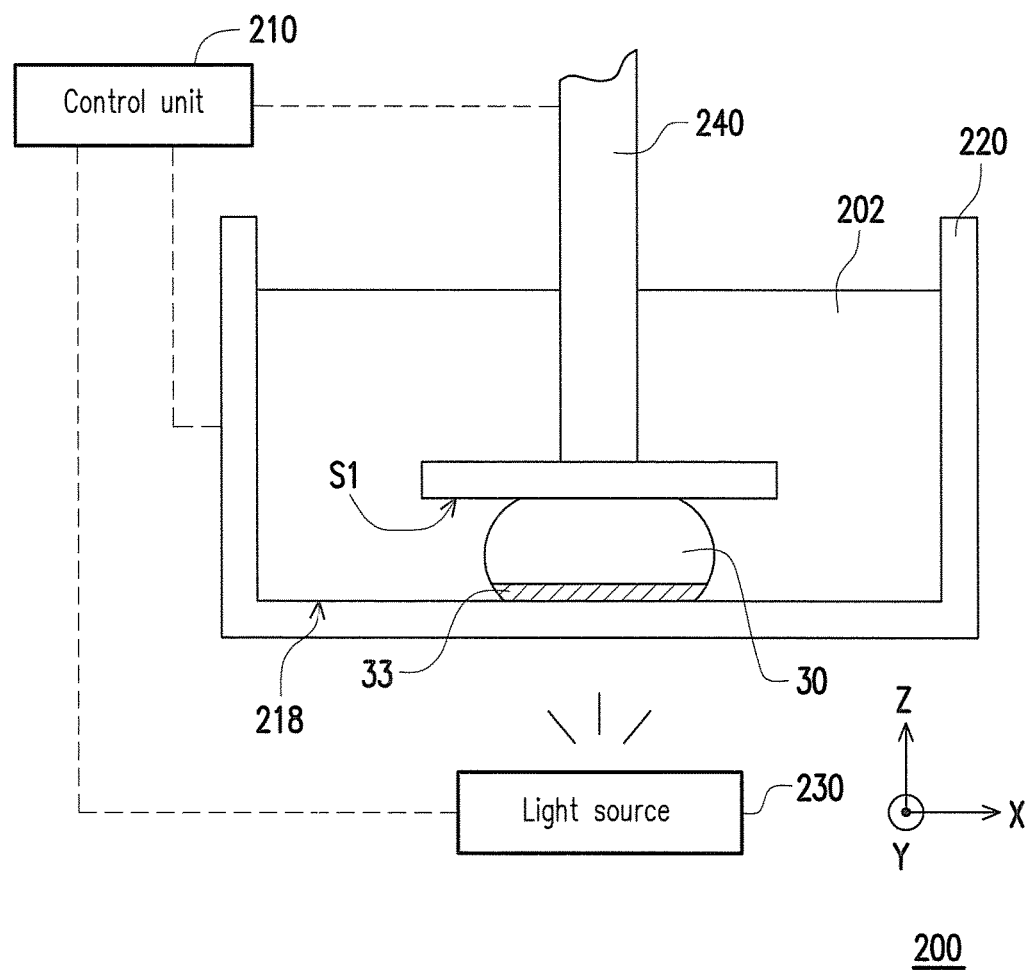
FIG. 3 illustrates a schematic view of a 3D printing system according to one of the exemplary embodiments.

FIG. 2 illustrates a schematic block diagram of a 3D printing system according to one of the exemplary embodiments. FIG. 3 illustrates a schematic diagram of a 3D printing system according to one of the exemplary embodiments. Referring to both FIGS. 2 and 3, in the embodiment, a 3D printing apparatus 200 may be a Stereo Lithography Appearance (SLA) 3D printing apparatus, including a control unit 210, a tank 220, a light source 230 and a movable platform 240. A rectangular coordinate system is also provided herein so as to describe relevant components and motion conditions thereof. The tank 220 is used for containing a liquid curing material 202, and the movable platform 240 is controlled by the control unit 210 to be movably disposed above the tank 220 and move along a Z-axis. Thereby, the movable platform 240 may be moved out of the tank 220 or into the tank 220 and be immersed in the liquid curing material 202.

More specifically, the 3D printing apparatus 200 projects light on the movable platform 240 via the light source 230 to solidify the liquid curing material 202 between a forming surface S1 of the movable platform 240 and a bottom 218 of the tank 220 and gradually drives the movable platform 240 away from the bottom 218 of the tank 220 along the Z-axis, so as to solidify a plurality of layer objects of a 3D object 30. For instance, the liquid curing material 202 is, for example, a photosensitive resin, and the light source 230 is used for providing light (such as ultraviolet light) in a wave band that is able to solidify the photosensitive resin. It needs to be specifically noted that since the liquid curing material 202 is solidified between the movable platform 240 and the bottom 218 of the tank 220, a solidified layer object 33 may possibly adhere to the bottom 218 of the tank 220. Therefore, in order to separate the recently solidified layer object 33 from the bottom 218 of the tank 220, the control unit 210 of this embodiment controls the tank 220 to swing or move according to a swing velocity, so that the layer object 33 may completely separated from the bottom 118.

Figure 4A:
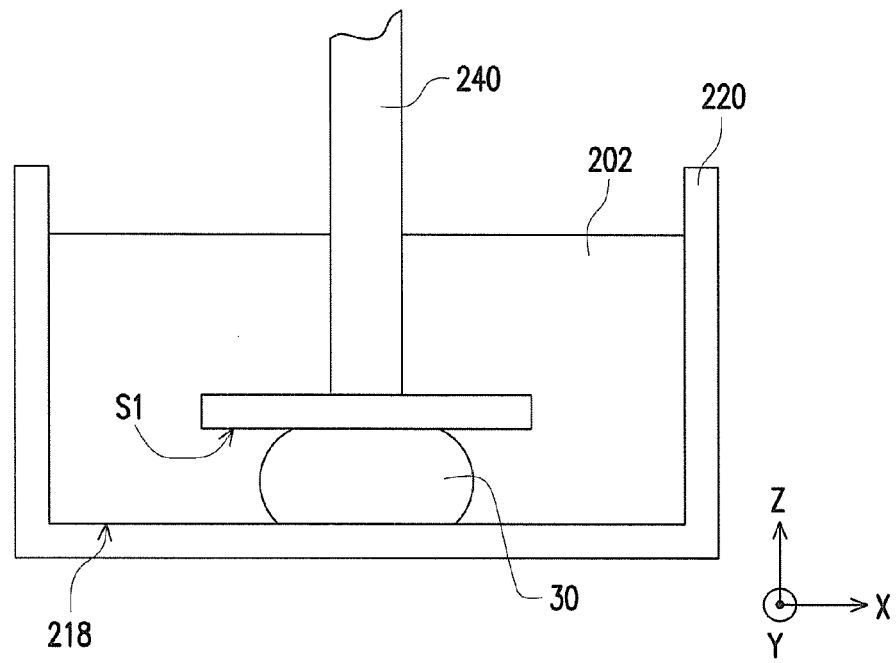
FIG. 4A is a schematic view of a tank in a printing status according to one of the exemplary embodiments.
Figure 4B:
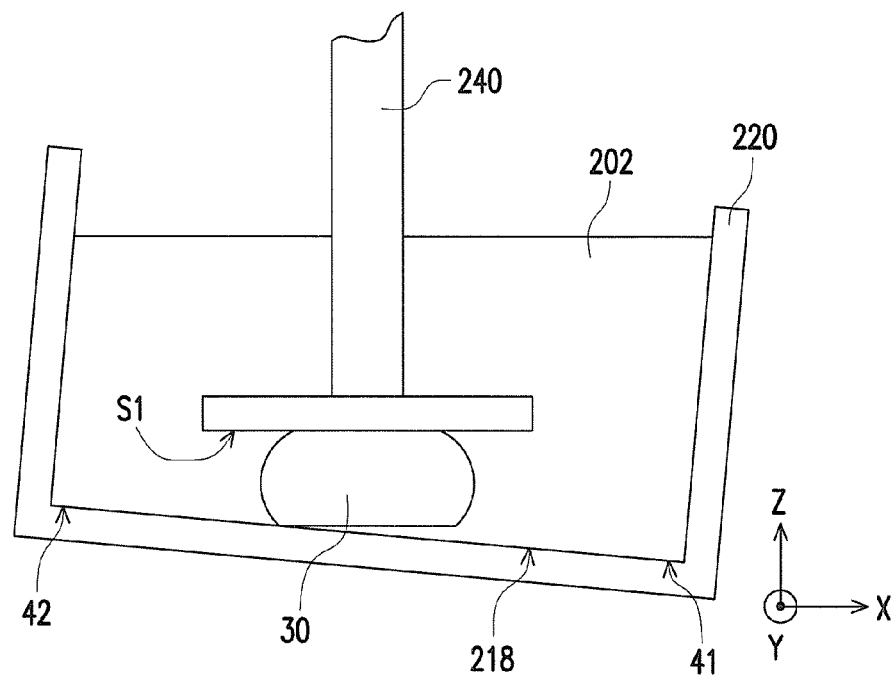
FIG. 4B is a schematic view of a tank in a swing status according to one of the exemplary embodiments.

More particularly, FIG. 4A is a schematic view of a tank in a printing status according to one of the exemplary embodiments. FIG. 4B is a schematic view of a tank in a swing status according to one of the exemplary embodiments. Referring to both FIGS. 4A and 4B, the tank 220 of the embodiment renders the printing status as shown in FIG. 4A when the 3D printing apparatus 200 performs printing, and the bottom 218 of the tank 220 and the forming surface S1 of the movable platform 240 are parallel. In this embodiment, the bottom 218 of the tank 220 is parallel to an XY plane. After the light source 230 projects light and solidifies the liquid curing material 202 between the movable platform 240 and the bottom 218 of the tank 220, the control unit 210 controls the tank 220 to swing, so that an edge side 41 of the bottom 218 of the tank 220 is lower than the other edge side 42 of the bottom 218 with respect to an XY plane as shown in FIG. 4B.

Therefore, the bottom 218 of the tank 220 is inclined as shown in FIG. 4B, so that the solidified liquid curing material 202 is easily separated from the bottom 218 of the tank 220. In this embodiment, the control unit 210 controls the tank 220 to swing according to different swing velocities. It is realized that when the swing velocity of the tank 220 is higher, the strength that the 3D object 30 is dragged instantly is larger. In contrast, when the swing velocity of the tank 220 is lower, the strength that the 3D object 30 is dragged instantly is smaller. Therefore, if the swing velocity of the tank 220 is too high, a more fragile part of the 3D object may be ruptured due to a drag that is too strong. However, the 3D printing apparatus of the disclosure adjusts the swing velocity of the tank adaptively according to structural characteristics of the 3D object, so as to avoid the phenomenon that the 3D object is ruptured.

Figure 5:
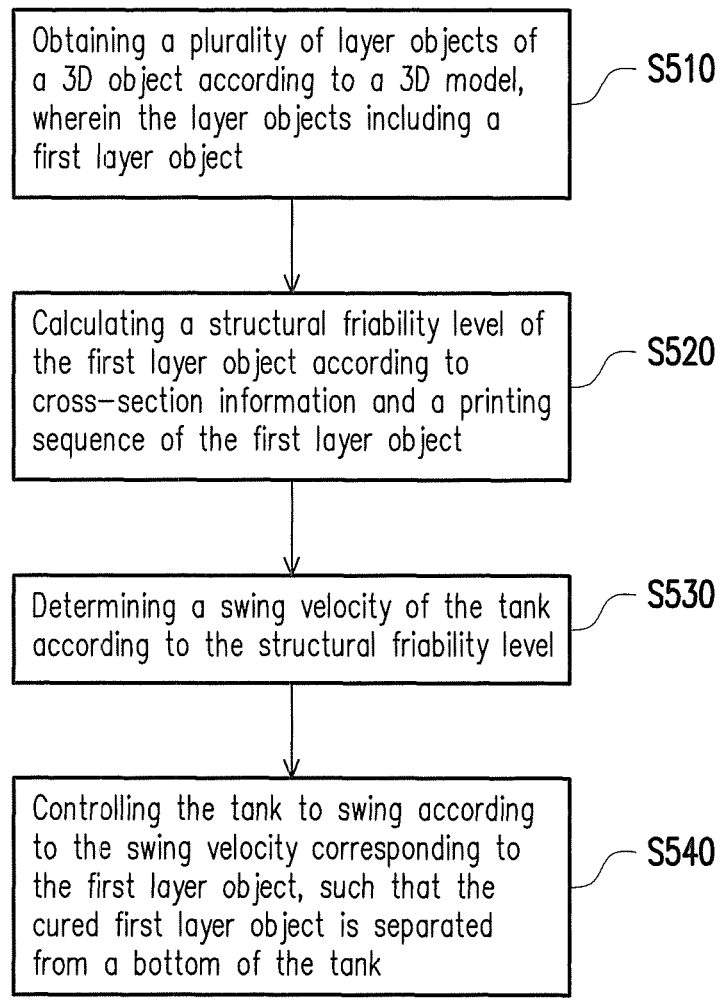
FIG. 5 illustrates a flowchart of a method for controlling a 3D printing apparatus according to one of the exemplary embodiments.

FIG. 5 illustrates a flowchart of a method for controlling a 3D printing apparatus according to one of the exemplary embodiments, so that the printing apparatus 200 in FIG. 3 is able to determine the swing velocity of the tank 220 according to the structural characteristics of the 3D object. The method in this embodiment is adaptable to the 3D printing system 10 in FIG. 1 and the 3D printing apparatus in FIG. 3. Detailed steps of the method for 3D printing in this embodiment are described with reference to each component in the 3D printing system 10 and the 3D printing apparatus 200.

First, in a step S510, the processor 110 obtains a plurality of layer objects of the 3D object according to a 3D model, and the layer objects include a first layer object. More simply, the first layer object is any one of these layer objects. It needs to be noted that in this embodiment, in addition to the processor 110, the host apparatus 100 further includes other hardware devices (for example, a chip set, a controller or a specific circuit, a storage unit, etc.) and/or software devices (for example, a software module or formula specifically used for realizing functions such as CAD or an animation modeling software). Based on the previous descriptions, persons having ordinary skills in the art should be able to understand the relationship between the layer objects and the 3D object, which is not repeated again herein.

In a step S520, the processor 110 calculates a structural friability level of the first layer object according to cross-section information and a printing sequence of the first layer object. In other words, after the processor 110 has performed layer processing according to the 3D model, cross-section information of each layer object is obtained. Based on the cross-section information corresponding to the layer objects respectively, the processor 110 further generates the control code file for controlling the 3D printing apparatus 200 according to the cross-section information. In addition, the processor 100 further analyzes and calculates information relevant to the layer objects based on the cross-section information of the layer objects. For instance, the processor 110 calculates cross-section areas of the layer objects or relative positions of the layer objects on an XY plane according to the cross-section information of the layer objects.

In addition, since the 3D object is stacked sequentially by the plurality of layer objects, each layer object has its printing sequence according to a printing direction of the 3D object. Simply put, a layer object having an earlier printing sequence is cured earlier on the movable platform 240, and a layer object having a later printing sequence is cured later on the movable platform 240. The processor 110 of this embodiment speculates the structural friability level of the 3D object in a printing status according to the cross-section information and the printing sequences of the layer objects. The structural friability level may be deemed as a chance parameter that the layer objects are ruptured when the layer objects are separated from the bottom of the tank.

It is realized that if the layer objects include a layer object having a small cross-section area, the layer object having the small cross-section area may be a portion that a rupture occurs more easily. Furthermore, in this embodiment, in addition to the cross-section information that may serve as a factor in determining the structural friability level, the printing sequence may also be an important factor in determining the structural friability level. Combining the printing sequence and the cross-section information, the processor 110 is able to speculate the structural features of the 3D object and know firmness level of the layer objects accordingly.

Figure 6A:
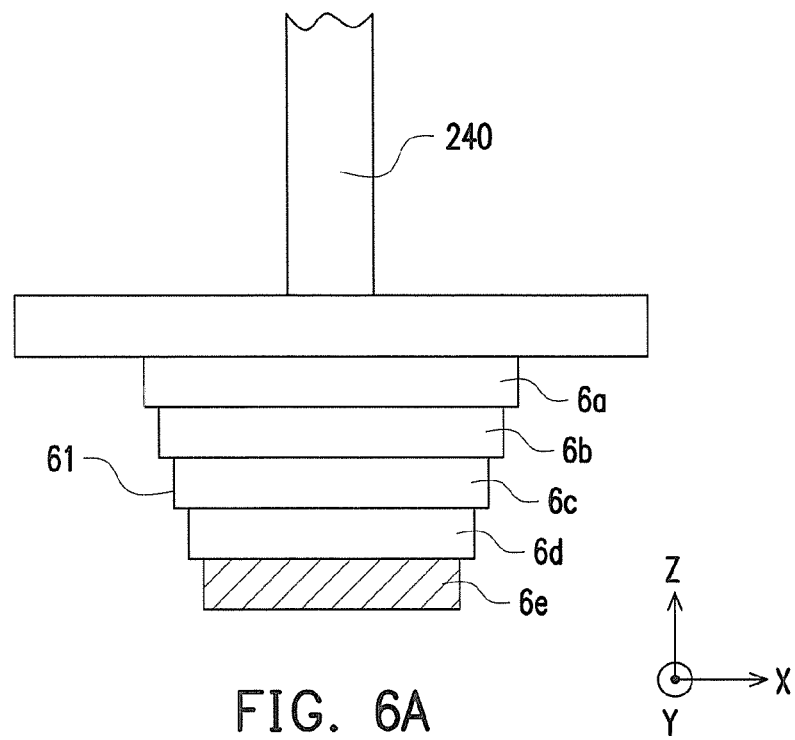
FIG. 6A illustrates an exemplary schematic diagram of a 3D object in a printing status according to one of the exemplary embodiments.
Figure 6B:
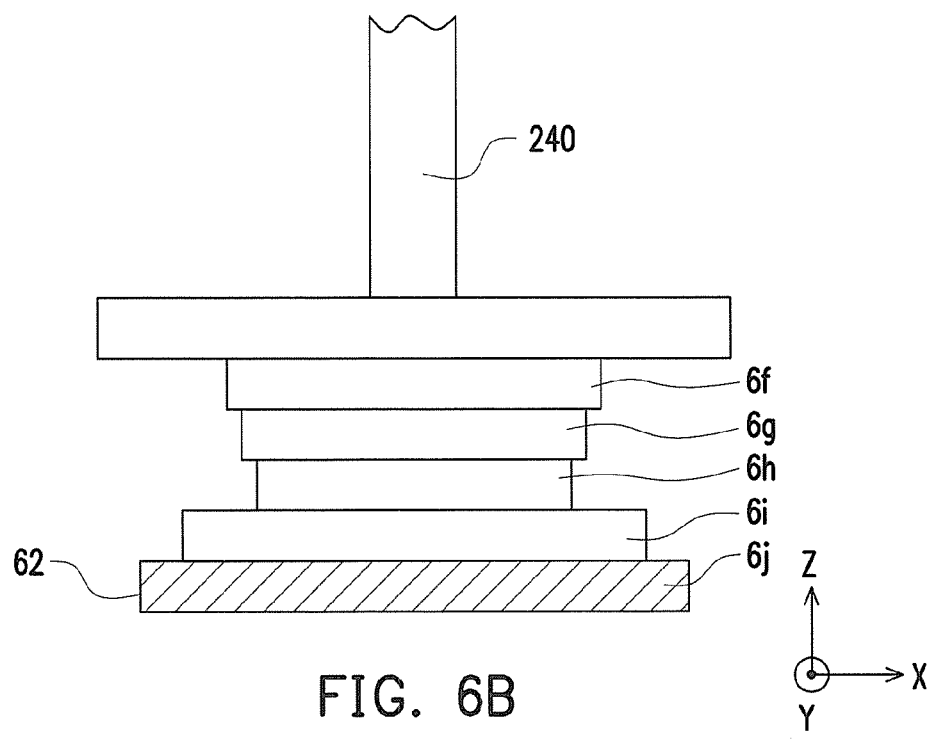
FIG. 6B illustrates an exemplary schematic diagram of a 3D object in a printing status according to one of the exemplary embodiments.

More specifically, FIGS. 6A-6B illustrate exemplary schematic diagrams of a 3D object in a printing status according to one of the exemplary embodiments. Referring to FIG. 6A first, a 3D object 61 is cured on the movable platform 240 layer by layer, and the 3D object under printing includes layer objects 6a, 6b, 6c, 6d and 6e. It is realized from the above descriptions that a printing sequence of the layer object 6a is earlier than that of the layer object 6b, and a printing sequence of the layer object 6b is earlier than that of the layer object 6b, and so on. After the layer object 6e is cured on the movable platform 240, although the cross-section area of the layer object 6e is smaller than others, cross-section areas of the layer objects 6a, 6b, 6c and 6d having printing sequences earlier than that of the layer object 6e are all larger than a cross-section area of the layer object 6e. Therefore, the processor 110 is able to judge that a structural friability level of the layer object 6e is lower.

Referring to FIG. 6B, a 3D object 62 is cured n the movable platform layer by layer, and the 3D object under printing includes layer objects 6f, 6g, 6h, 6i and 6j. It is realized from the above descriptions that a printing sequence of the layer object 6h is earlier than that of the layer object 6i, and a printing sequence of the layer object 6i is earlier than that of the layer object 6j, and so on. According to the printing sequence and cross-section area of each layer object, the processor 110 is able to know that when the layer object 6j is separated from the bottom 218 of the tank 220, the layer object 6h is a portion that a rupture may occur. Therefore, the processor 110 is able to judge that a structural friability level corresponding to the layer object 6j is higher according to the printing sequence and the cross-section area of the layer object 6j.

Therefore, in a step S530, the processor 110 determines a swing velocity of the tank 220 according to the structural friability level and generates corresponding control codes or control instructions according to the determined result. Next, while the 3D printing apparatus 200 receives control command from the host apparatus and starts the printing process, in a step S540, the control unit 210 of the 3D printing apparatus 200 controls the move or swing of the tank 220 according to the swing velocity corresponding to the first layer object, so that the cured first layer object is separated from the bottom 218 of the tank 220. That is to say, the 3D printing apparatus 200 is able to control the swing velocity of the tank 220 according to the control code or the control instruction transmitted from the host apparatus 100 to avoid the condition that the solidified liquid curing material 202 adhered to the bottom 218 of the tank 220 and is ruptured when the movable platform 240 moves upwards. In addition, it could be prevented that the solidified liquid curing material 202 adheres to the bottom 218 of the tank 220 and affects subsequent printing quality.

Figure 7:
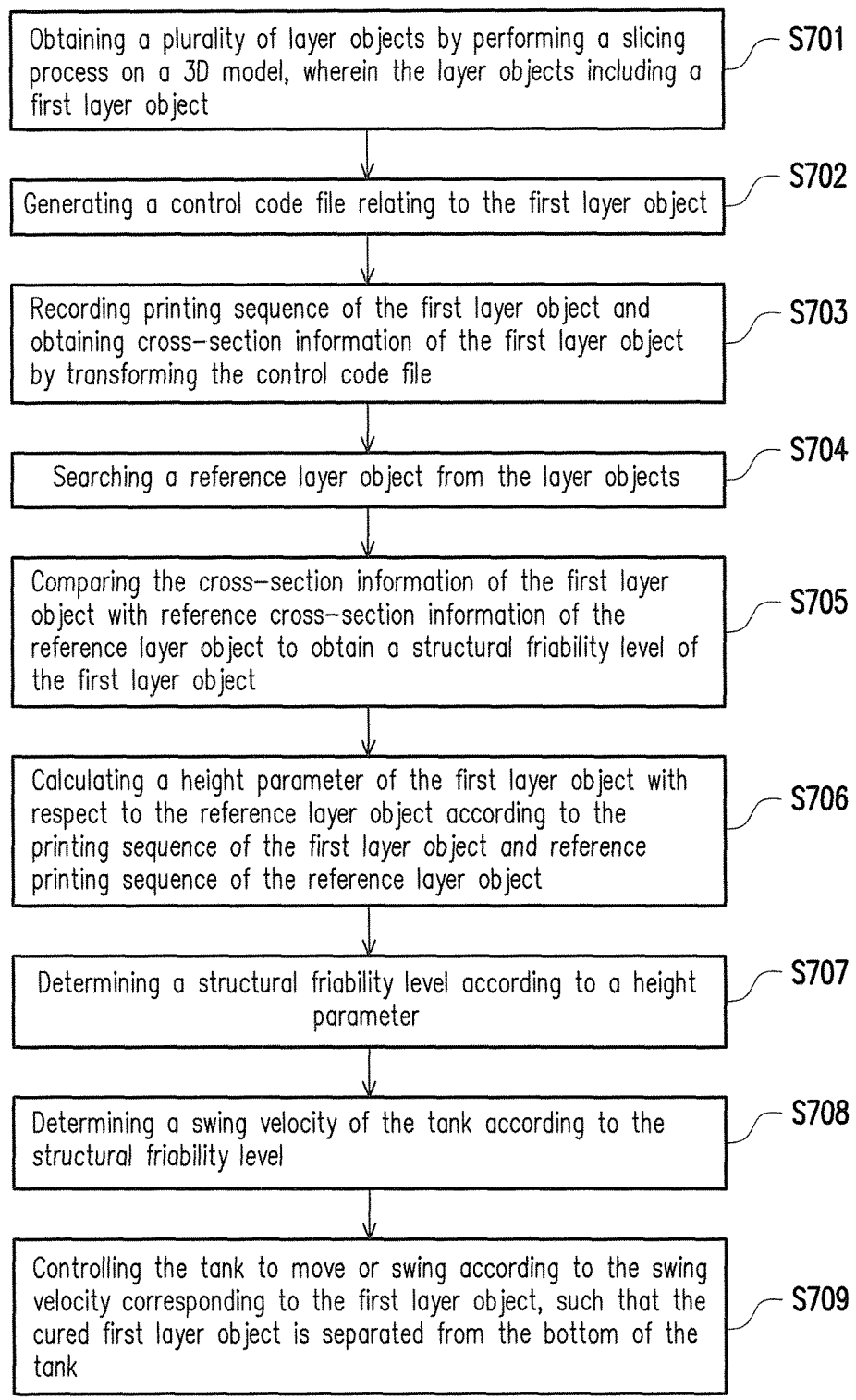
FIG. 7 illustrates a flowchart of a method for controlling a 3D printing apparatus according to one of the exemplary embodiments.

To further describe in detail how the exemplary embodiment determines a structural friability level of each layer object, FIG. 7 illustrates a flowchart of a method for controlling a 3D printing apparatus according to one of the exemplary embodiments, so that the 3D printing apparatus 200 in FIG. 3 is able to determine a swing velocity of the tank 220 according to the structural characteristics of the 3D object. The method in this embodiment is adaptable to the 3D printing system 10 in FIG. 1 and the 3D printing in FIG. 3. Detailed steps of the method for 3D printing in this embodiment are described with reference to each member in the 3D printing system 10 and the 3D printing apparatus 200.

First, in a step S701, the processor 110 performs a slicing process to the 3D model to obtain the layer objects. In a step S702, the processor 110 generates the control code file relating to the first layer object, and the first layer object is any one of the layer objects. In a step S703, the processor 110 records a printing sequence of the first layer object and obtains the cross-section information of the first layer object by transforming the control code file. That is to say, the processor 110 obtains the cross-section information and the printing sequence of each layer object.

Next, in a step S704, the processor 110 searches a reference layer object from the layer objects. In this embodiment, the processor is able to select a reference layer object from all the layer objects, and the reference layer object is used as a basis of comparison to determine the structural friability levels of other layer objects. More specifically, the reference layer object is a portion that a rupture may occur more easily during printing. The disclosure estimates the structural friability level of each layer object by comparing the cross-section information of each layer object with the cross-section information of the reference layer object.

In an embodiment, the processor 110 may select a layer object having a least cross-section area as the reference layer object. That is to say, the cross-section area of the reference layer object may be smaller than the cross-section area of each layer object. Alternatively, in another embodiment, the processor 110 may take a layer object having a cross-section area smaller than a threshold value as the reference layer object. That is to say, the cross-section area of the reference layer object is smaller than the threshold value, and the disclosure does not limit on the way of selecting the reference layer object and a number thereof, which may be determined by persons having ordinary skills in the art according to actual needs and conditions.

Then, in a step S705, the processor 110 compares the cross-section information of the first layer object with reference cross-section information of the reference layer object to obtain a structural friability level of the first layer object. It needs to be specifically noted that the printing sequence of the first layer object is later than a reference printing sequence of the reference layer object. In other words, the reference printing sequence of the reference layer object is earlier than the printing sequence of the first layer object.

More specifically, the reference layer object is a portion that a rupture may occur during printing. Therefore, to estimate the chance that the reference layer object is ruptured due to separation of the layer objects cured later than the reference layer object, the processor 110 compares the cross-section information of the layer object cured later than the reference layer object with the reference cross-section information of the reference layer object.

In a step S706, the processor 110 calculates a height parameter of the first layer object with respect to the reference layer object according to the printing sequence of the first layer object and the reference printing sequence of the reference layer object. In a step S707, the processor 110 determines the structural friability level according to the height parameter. More specifically, each layer object has a corresponding thickness, and it is presumed that the thickness of each layer object is consistent in this embodiment. Accordingly, based on the thicknesses of the layer objects and the printing sequences of the layer objects, the processor 110 is able to calculate the height parameter between the reference layer object and the first layer object to be a total thickness. More simply, since it is easier for an object having a larger length to be ruptured, this embodiment takes the height parameter as one of the determining factors for determining the structural friability levels of the layer objects.

In general, the processor 110 determines the structural friability levels of the layer objects according to the cross-section area and the height parameter of the layer objects. In this embodiment, the structural friability level is in direct proportion to the cross-section area of the first layer object, and the structural friability level is in inverse proportion to the cross-section area of the reference layer object. The height parameter is proportion to the structural friability level. Accordingly, the processor 110 in this embodiment calculates the structural friability level of the first layer object via, for example, the following mathematical formula (1).

$$R = \frac{(A-a)}{a} * H \tag{1}$$

Therein, R represents the structural friability levels of the layer objects, A represents the cross-section area of the first layer object, a represents the cross-section area of the reference object, and H represents the height parameter of the first layer object with respect to the reference layer objects.

Figure 8:
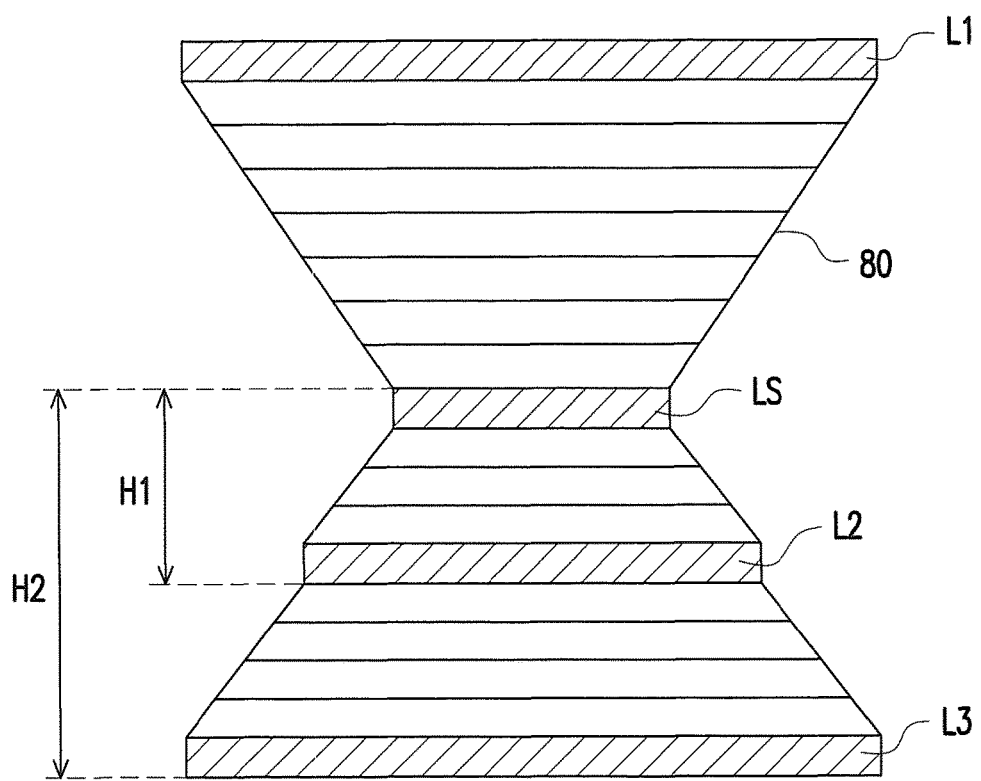
FIG. 8 illustrates an exemplary schematic diagram of calculating a structural friability level according to one of the exemplary embodiments.

For instance, FIG. 8 illustrates an exemplary schematic diagram of calculating a structural friability level according to one of the exemplary embodiments. Referring to FIG. 8, a 3D object 80 includes at least a layer object L1, a layer object LS, a layer object L2 and a layer object L3. In this embodiment, assuming that a printing sequence of the layer object L1 is the earliest, the layer object L1 adheres to the forming surface S1 of the movable platform 240 during whole printing period. A printing sequence of the layer object LS is later than the printing sequence of the layer object L1, a printing sequence of the layer object L2 is later than the printing sequence of the layer object LS, and a printing sequence of the layer object L3 is later than the printing sequence of the layer object L2.

In this example, since the layer object LS has a smallest cross-section area, the processor 110 searches the layer object LS as the reference layer object, and the cross-section area of the layer object LS is a1. Next, take the layer object L2 for example, if the cross-section area of the layer object L2 is A1, and the height parameter of the layer object L2 is H1 as shown in FIG. 8, a structural friability level of the layer object L2 is $R_{2S}=[(A1-a1)/a1]*H1$. In addition, take the layer object L3 for example, if the cross-section area of the layer object L3 is A2, and the height parameter of the layer object L3 is H2 as shown in FIG. 8, a structural friability level of the layer object L3 is $R_{3S}=[(A2-a1)/a1]*H2$. It is also realized that a structural friability level $R_{3S}$ of the layer object L3 is larger than a structural friability level $R_{2S}$ of the layer object L2. That it to say, compared with the layer object L2, the 3D object 80 is more likely to be ruptured when the layer object L3 is separated from the bottom 218 of the tank 220.

Therefore, in a step S708, the processor 110 determines the swing velocity of the tank 220 according to the structural friability level. For instance, when the structural friability level is larger than a dangerous threshold value, the processor 110 is able to reduce the swing velocity of the tank 220. In addition, the processor 110 is also able to determine the swing velocity of the tank 220 according to a lookup table, which records multiple ranges of the structural friability level and corresponding swing velocities. For instance, Table 1 is an example of the lookup table. According to the Table 1, when the processor 110 knows that that a structural friability level of a certain layer object is between a structural friability level R1 and a structural friability level R2, the processor 110 determines that the swing velocity is V1. When the processor 110 knows that that a structural friability level of a certain layer object is between the structural friability level R2 and a structural friability level R3, the processor 110 determines that the swing velocity is V2. When the processor 110 knows that that a structural friability level of a certain layer object is between the structural friability level R3 and a structural friability level R4, the processor 110 determines that the swing velocity is V3.

TABLE 1

| Range of structural friability level | Swing velocity |
| --- | --- |
| R1-R2 | V1 |
| R2-R3 | V2 |
| R3-R4 | V3 |

However, Table 1 is merely exemplary. Persons having ordinary skills in the art are able to determine the adjustment extent or configuration of the swing velocity according to experiments or actual conditions. Finally, after the first layer object is solidifies and cured between the movable platform 240 and the bottom 218 of the tank 220, in a step S709, the control unit 210 of the 3D printing apparatus 200 controls the move or swing of the tank 220 according to the swing velocity corresponding to the first layer object, so that the cured first layer object is separated from the bottom 218 of the tank 220.

Based on the above, the structural friability levels of the layer objects are analyzed by means of the cross-section information and the printing sequences of the layer objects, and the strength for swinging the tank or the swing velocity is determined by the structural friability levels of the layer objects. Thereby, when the 3D printing apparatus intends to control the swing of the tank so that the layer object adhering to the bottom of the tank is separated from the bottom of the tank, the 3D printing apparatus dynamically adjusts the swing velocity of the tank according to structural characteristics of the 3D object. Thus, it could be avoided that the 3D object is cracked or ruptured due to the swing of the tank when the 3D printing apparatus separates the completely cured liquid curing material from the bottom of the tank. Furthermore, since the 3D printing apparatus is able to adjust the swing velocity of the tank adaptively, when printing a 3D object having a firm structure, the 3D printing apparatus is able to save printing time by raising the swing velocity of the tank.

Although the disclosure has been described with reference to the above embodiments, it will be apparent to persons having ordinary skill in the art that modifications to the described embodiments may be made without departing from the spirit of the disclosure. Accordingly, the scope of the disclosure will be defined by the attached claims and not by the above detailed descriptions.

What is claimed is:

1. A method for controlling a three-dimensional printing apparatus, applicable for controlling a tank of the three-dimensional printing apparatus, wherein the three-dimensional printing apparatus is adapted for printing a three-dimensional object relating to a three-dimensional model, the method comprising:
   obtaining a plurality of layer objects of the three-dimensional object according to the three-dimensional model, wherein the layer objects comprise a first layer object;
   searching a reference layer object from the object layers, wherein the reference layer object is stacked above the first layer object along an z-axis;
   comparing the cross-section information of the first layer object with reference cross-sectional information of the reference layer object to obtain a structural friability level of the first layer object,
   determining a swing velocity of the tank according to the structural friability level;
   controlling a light source to project light on liquid curing material in the tank, such that the first layer object is cured on a bottom of the tank; and
   controlling the tank to swing according to the swing velocity corresponding to the first layer object, such that the cured first layer object is separated from the bottom of the tank.

2. The method according to claim 1, wherein obtaining the layer objects of the three-dimensional object according to the three-dimensional model comprises the following steps:

performing a slicing process on the three-dimensional model to obtain the layer objects;

generating a control code file relating to the first layer object; and recording the printing sequence of the first layer object and obtaining the cross-section information of the first layer object by transforming the control code file.

3. The method according to claim 1, wherein a cross-section area of the reference layer object is smaller than a cross-section area of each of the other layer objects or smaller than a threshold value.

4. The method according to claim 1, wherein the structural friability level is in direct proportion to the cross-section area of the first layer object, and the structural friability level is in inverse proportion to the cross-section area of the reference layer object.

5. The method according to claim 1, wherein the printing sequence of the first layer object is later than a reference printing sequence of the reference layer object.

6. The method according to claim 5, further comprising:

calculating a height parameter of the first layer object with respect to the reference layer object according to the printing sequence of the first layer object and the reference printing sequence of the reference layer object; and determining the structural friability level according to the height parameter.

7. The method according to claim 6, wherein the height parameter is in direct proportion to the structural friability level.

8. The method according to claim 1, wherein determining the swing velocity of the tank according to the structural friability level comprises the following step:

reducing the swing velocity of the tank when the structural friability level is greater than a dangerous threshold value.

9. A three-dimensional printing system, adapted for printing a three-dimensional object relating to a three-dimensional model, the three-dimensional printing system comprising:

a three-dimensional printing apparatus, comprising a tank for containing a liquid curing material;

a movable platform, movably disposed above the tank;

a light source, disposed below the tank for projecting light on the liquid curing material, such that the layer objects are solidified on the movable platform layer by layer; and a control unit, coupled to the tank, the movable platform and the light source, a host apparatus, coupled to the three-dimensional apparatus and comprising a processor, wherein the processor obtains a plurality of layer objects of the three-dimensional object according to the three-dimensional model, the layer objects comprising a first layer object, and the processor searches a reference layer object from the layer objects, wherein the reference layer object is stacked above the first layer object along an z-axis, and compares the cross-section information of the first layer object with reference cross-section information of the reference layer object to obtain a structural friability level of the first layer object, and a printing sequence of the first layer object and determines a swing velocity of the tank according to the structural friability level, the control unit controls the tank to swing according to the swing velocity corresponding to the first layer object after the first layer object is solidified and cured between the movable platform and a bottom of the tank, such that the cured first layer object is separated from the bottom of the tank.

10. The three-dimensional printing system according to claim 9, wherein the processor performs a slicing process on the three-dimensional model to obtain the layer objects, generates a control code file relating to the first layer object, records the printing sequence of the first layer object and obtains the cross-section information of the first layer object by transforming the control code file.

11. The three-dimensional printing system according to claim 9, wherein a cross-section area of the reference layer object is smaller than a cross-section area of each of the other layer objects or smaller than a threshold value.

12. The three-dimensional printing system according to claim 9, wherein the structural friability level is in direct proportion to the cross-section area of the first layer object, and the structural friability level is in inverse proportion to the cross-section area of the reference layer object.

13. The three-dimensional printing system according to claim 9, wherein the printing sequence of the first layer object is later than a reference printing sequence of the reference layer object.

14. The three-dimensional printing system according to claim 13, wherein the processor further calculates a height parameter of the first layer object with respect to the reference layer object according to the printing sequence of the first layer object and the reference printing sequence of the reference layer object and determines the structural friability level according to the height parameter.

15. The three-dimensional printing system according to claim 14, wherein the height parameter is in direct proportion to the structural friability level.

16. The three-dimensional printing system according to claim 9, wherein the processor reduces the swing velocity of the tank when the structural friability level is greater than a dangerous threshold value.

* * * * *